Nov. 3, 1925.

J. O. BOVING 1,559,935

MEANS FOR UTILIZING TIDAL ENERGY

Filed Feb. 25, 1925

INVENTOR:
Jens Orten Boving
BY: Francis E. Boyer
ATTORNEY

Patented Nov. 3, 1925.

1,559,935

UNITED STATES PATENT OFFICE.

JENS ORTEN BOVING, OF LONDON, ENGLAND.

MEANS FOR UTILIZING TIDAL ENERGY.

Application filed February 25, 1925. Serial No. 11,398.

*To all whom it may concern:*

Be it known that I, JENS ORTEN BOVING, subject of the King of Great Britain, residing at London, England, have invented new and useful Improvements in Means for Utilizing Tidal Energy, of which the following is a specification.

This invention relates to tidal energy utilization plants of the proposed type in which water, under the head due to difference of levels between a tidal region and a basin dammed therefrom flows down a shaft, having an inlet rising and falling with the respective water level, and ascends another shaft to escape at a lower level than the level at the inlet, and air inspired by the descending column of water separates from the water and is trapped in a chamber at the bottom of the shafts and is thus subjected to the pressure head of the colmun of water in the upcast shaft.

Now if the difference of level at the various states of tide constitutes a considerable proportion of the total hydraulic column on which the air pressure depends, such air pressure, in the absence of special precautions to the contrary, will vary considerably with the changes in the water levels.

The object of the present invention is to enable the air pressure generated by a tidal energy utilization plant of the above described type, to be kept practically constant during all active stages of the tide.

Moreover, within the limits of the various possible maximum outputs, the means employed for this purpose also maintains the air pressure practically constant under all changes in the various factors upon which the air pressure depends, such as variation in the difference of the levels on the two sides of the dam, and changes in the load.

For the above purpose, according to the invention, means responsive to changes in the air pressure are provided whereby the difference between the water level above the upcast shaft and the water level in the air-trapping chamber is kept and remains approximately constant. For instance, as the water level above the upcast shaft varies, the water level in the air-trapping chamber is correspondingly varied by being either depressed by the compression of increased volumes of air or permitted to rise by compression of decreased volumes of air, so that the head on which the air pressure depends remains practically constant.

This can be effected by progressively opening the intake as the pressure-effecting water level descends, the thereby increased flow of water entraining correspondingly increased quantities of air, or vice versa.

The progressive opening of the intake can be automatically controlled by a pneumatic piston or other organ the position of which is dependent upon the pressure of the air in the air-trapping chamber from which it is supplied with compressed air.

The progressive increase in the opening of the inlet may and preferably does, as above mentioned, also compensate for the fluctuating difference between the levels of the water on the two sides of the dam; thus the output of an air turbine or other machine utilizing the compressed air can be maintained practically constant over a very wide range of fluctuating heads of water.

A diagrammatic representation of a tidal energy utilization plant arranged to maintain a constant pressure of compressed air at various stages of the tide is shown, by way of example, on the accompanying drawing, in which:—

Figure 1:
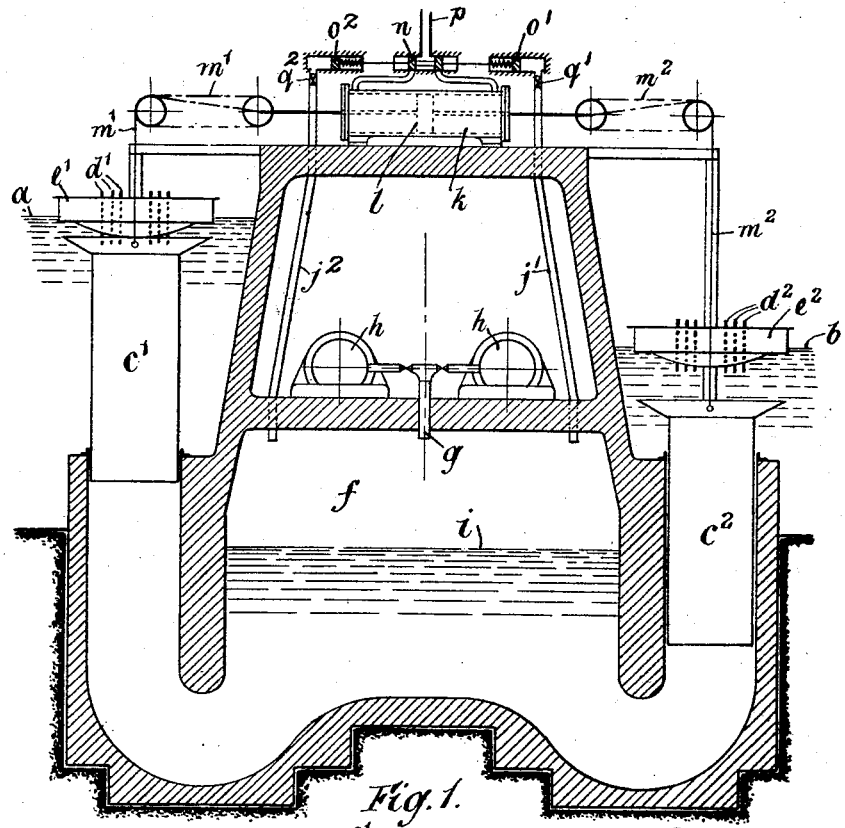
Fig. 1 is a transverse section through the dam.

$a$ is a dammed-in basin and $b$ a tidal region, between which there is an alternating interchange of water. With the levels in $a$ and $b$ shown on the drawing the water flows from the basin $a$ down a telescoping pipe $c^1$ and the fixed concrete continuation shaft thereof and up a telescoping pipe $c^2$ into the tidal region $b$.

The water flowing down the downcast pipe $c^1$ inspires air through pipes $d^1$ in a floating head $e^1$. The so-entrained air is trapped in a chamber $f$ beneath the dam and is subject to the pressure of the head of water in the upcast pipe $c^2$ and tidal region $b$.

$g$ is a pipe supplying compressed air from the chamber $f$ to turbo-generators $h$ for example.

The flow of water down the pipe $c^1$ depends upon the difference between the levels in the basin $a$ and in the tidal region $b$ and on the degree of opening of the mouth of the downcast pipe $c^1$. This degree of opening is controlled by the degree of approach of the mouth of the telescoping pipe $c^1$ to its floating head $e^1$.

Now as the level in the tidal region $b$ changes, if the level $i$ of the water in the air-trapping chamber $f$ remained constant, the pressure head $b\ i$ to which the air is subjected would vary. However, to avoid variation of this pressure head $b\ i$ it is arranged that the water level $i$ in the air-trapping chamber $f$ shall vary, correspondingly to the change in the water level in the tidal region $b$, whilst the water is flowing from the basin $a$.

To effect this maintenance of a constant difference of level $b\ i$, in the arrangement ilustrated a pipe $j^1$ supplies compressed air from the chamber $f$ to control a servo-motor, consisting of a cylinder $k$ in which moves a piston $l$ connected by a cable tackle $m^1$ to the telescoping downcast pipe $c^1$. A distributing valve $n$ connected to a spring loaded piston $o^1$ controls the supply of oil under pressure from a pipe $p$ to either end of the cylinder $k$. The piston $o^1$ is so spring loaded that on decrease of air pressure in the chamber $f$ the valve $n$ is displaced to admit oil to the right hand end of the cylinder $k$ so that its piston $l$ moves in a direction to lower the telescoping downcast pipe $c^1$. This results in increasing the separation between the floating head $e^1$ and the mouth of the pipe $c^1$. More water consequently flows down the pipe $c^1$ and the increased amount of air thus inspired and trapped depresses the level $i$ of the water in the chamber $f$ and thus compensates for sinking of the level in the tidal region $b$, keeping the pressure head $b\ i$ constant.

Conversely on increase of the air pressure in the chamber $f$, the piston $o^1$ overcomes the influence of its spring and displaces the valve $n$ to admit oil to the left hand end of the cylinder $k$ to move its piston $l$ in the direction to raise the downcast pipe $c^1$. This reduces the distance between the mouth of this pipe $c^1$ and its floating head $e^1$ and consequently reduces the inflow of water and entrained air.

The weight of the pipe $c^1$ is balanced by connecting the pipe $c^1$ through the piston $l$ to the upcast telescoping pipe $c^2$ by the cable tackle $m^2$.

The mouth of the upcast pipe $c^2$ is arranged to be sufficiently remote from its floating head $e^2$ to allow free discharge of the operating water, as shown in connection with the pipe $c^2$ and the floating head $e^2$.

On reversal of the tide and consequent reversal of the flow, which will then occur down the pipe $c^2$ and up the pipe $c^1$, the servo-motor $k$ must operate in the reverse directions to those above described, on increase and decrease of pressure respectively.

To permit of this, a cock $q^1$ in the air pipe $j^1$ leading to the piston $o^1$ is closed, and a cock $q^2$, in the pipe $j^2$ leading to a second spring loaded piston $o^2$ is opened. This piston $o^2$ is also connected to the distributing valve $n$, but is oppositely spring loaded to the piston $o^1$, and thus under increases and decreases in the air pressure causes the admission of oil to the ends of the cylinder $k$ the reverse to those at which under like conditions the piston $o^1$ would have caused admission.

It is obvious that should the output and consequently the consumption of compressed air by the turbo-generators $h$ vary, the servo-motor $k$ will move the pipe $c^1$ and $c^2$ correspondingly to maintain a constant air pressure. Also variation in the operating head between the basin $a$ and tidal region $b$ is compensated for by this means.

Figure 2:
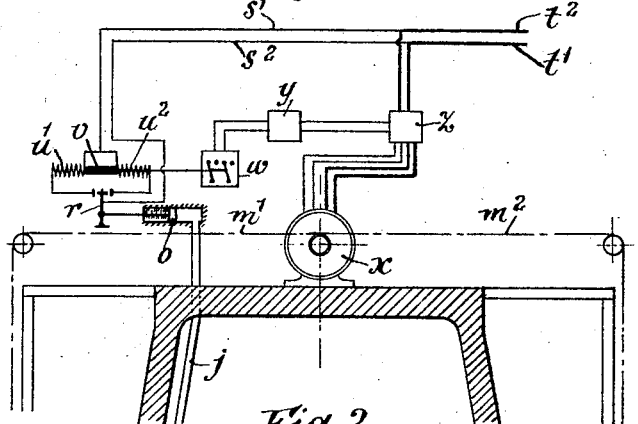
Fig. 2 shows a modification.

Fig. 2 shows an electrical arrangement for operating the cables $m^1, m^2$ to raise and lower the pipes $c^1, c^2$. Compressed air is supplied by a pipe $j$ from the air-trapping chamber $f$ to a spring-loaded piston $o$. This piston $o$ is connected to a switch lever $r$ arranged alternatively to close a shunt circuit $s^1, s^2$ from electric mains $t^1, t^2$ either through a solenoid $u^1$ or through a solenoid $u^2$. In accordance with which solenoid $u^1$ or $u^2$ is thus energized, a core $v$ is displaced in one of two opposite directions and, being connected to a reversing switch $w$, controls the rotation in one direction or the other of the armature of an electro-motor $x$, which thereby by the cables $m^1, m^2$ either raises or lowers the pipe $c^1$ whilst lowering or raising the pipe $c^2$.

It will be understood that the electric connections are so arranged that on the pressure of the air acting on the piston $o$ increasing and thereby the shunt circuit $s^1, s^2$ being closed through the solenoid $u^1$ thus drawing the core $v$ to the left, the reversing switch $w$ so connects the motor $x$ that it winds up the downcast pipe $c^1$, to constrict the inlet and reduce the amount of air inspired.

A hand-adjusted reversing switch $y$ is provided to reverse the motor connections when on reversal of flow the pipe $c^2$ becomes the downcast pipe.

$z$ is a junction box housing the junctions of the motor and switch leads.

I claim:—

1. In a tidal energy utilization plant, a downcast shaft, a rising and falling inlet to said downcast shaft, means entraining air by water flowing down said inlet, an air-trapping chamber leading from said downcast shaft, an upcast shaft leading from said air-trapping chamber, and means responsive to changes in the air pressure in said air-trapping chamber maintaining approximately constant the difference between the water level in said air-trapping chamber and the water level above said upcast shaft.

2. In a tidal energy utilization plant, a downcast shaft, a rising and falling inlet to said downcast shaft, means entraining air by water flowing down said inlet, an air-trapping chamber leading from said downcast shaft, an upcast shaft leading from said air-trapping chamber, and means varying the water level in said air-trapping chamber in correspondence with changes in the water level above said upcast shaft.

3. In a tidal energy utilization plant, a downcast shaft, a rising and falling inlet to said downcast shaft, means entraining air by water flowing down said inlet, an air-trapping chamber leading from said downcast shaft, an upcast shaft leading from said air-trapping chamber, and a servo-motor controlled by the air pressure in said air-trapping chamber and increasing the opening of said inlet on decrease of said air pressure and decreasing said opening on increase of said air pressure.

4. In a tidal energy utilization plant, a downcast shaft, a floating inlet head above said downcast shaft, a downcast pipe telescoping in said downcast shaft below said floating inlet head, means entraining air beneath said floating inlet head by water flowing down said downcast pipe, an air-trapping chamber leading from said downcast shaft, an upcast shaft leading from said air-trapping chamber, a servo-motor controlled by the air pressure in said air-trapping chamber, and suspension means interconnecting said telescoping downcast pipe and said servo-motor and displaced in alternative directions by said servo-motor.

5. In a tidal energy utilization plant, a pair of shafts, a floating head above each said shaft, a pipe telescoping in each said shaft below each said floating head, means entraining air beneath said floating heads by water flowing down either said shafts, an air-trapping chamber interconnecting said shafts, a servo-motor controlled by the air pressure in said air-trapping chamber, suspension means interconnecting said telescoping pipes through and displaced in alternative directions by said servo-motor, and means for reversing the action of said air-pressure on said servo-motor on reversal of the flow of water through said shafts.

In testimony whereof I have signed my name to this specification.

JENS ORTEN BOVING.